United States Patent
Kohno (10) Patent No.: US 8,701,475 B2
(45) Date of Patent: Apr. 22, 2014

(54) AIR FLOW MEASURING DEVICE

(75) Inventor: Yasushi Kohno, Obu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/568,481

(22) Filed: Aug. 7, 2012

(65) Prior Publication Data

US 2013/0036806 A1 Feb. 14, 2013

(30) Foreign Application Priority Data

Aug. 9, 2011 (JP) ................................ 2011-173923

(51) Int. Cl.
*G01M 15/04* (2006.01)
(52) U.S. Cl.
USPC ...................................... 73/114.33
(58) Field of Classification Search
USPC ............... 73/114.32–114.34, 204.11–204.27
See application file for complete search history.

(56) References Cited

U.S. PATENT DOCUMENTS

| 5,780,735 | A | 7/1998 | Kadohiro et al. | |
|---|---|---|---|---|
| 6,581,447 | B1* | 6/2003 | Strohrmann et al. | 73/114.32 |
| 7,520,051 | B2* | 4/2009 | Becke et al. | 29/832 |
| 8,091,413 | B2* | 1/2012 | Saito et al. | 73/114.33 |
| 8,215,160 | B2* | 7/2012 | Saito et al. | 73/114.34 |
| 2010/0031737 | A1 | 2/2010 | Saito et al. | |
| 2011/0072894 | A1* | 3/2011 | Saito et al. | 73/114.34 |
| 2012/0198925 | A1* | 8/2012 | Saito et al. | 73/114.33 |

FOREIGN PATENT DOCUMENTS

| JP | 7-229776 | 8/1995 |
|---|---|---|
| JP | 10-197305 | 7/1998 |
| JP | 2010-145155 | 7/2010 |
| JP | 2010-151795 | 7/2010 |

OTHER PUBLICATIONS

Office Action (1 page) dated Jul. 9, 2013, issued in corresponding Japanese Application No. 2011-173923 and English translation (2 pages).
Office Action (1 page) dated Sep. 17, 2013, issued in corresponding Japanese Application No. 2011-173923 and English translation (2 pages).

* cited by examiner

*Primary Examiner* — Freddie Kirkland, III
(74) *Attorney, Agent, or Firm* — Nixon & Vanderhye P.C.

(57) ABSTRACT

An air flow measuring device includes a housing, flow sensor, and a humidity sensor. The housing defines a bypass flow passage through which intake it passes. A part of intake air is taken into the bypass flow passage to pass through the bypass flow passage. The flow sensor includes a sensing part disposed in the bypass flow passage, and produces a signal which is in accordance with the flow rate of intake air as a result of heat transfer between intake air taken into the bypass flow passage and the sensing part. The humidity sensor includes a sensing part exposed to the intake passage, and projects from an outer wall of the housing into the intake passage. The humidity sensor produces a signal which is in accordance with humidity of intake ail flowing through the intake passage.

4 Claims, 6 Drawing Sheets

AIR FLOW MEASURING DEVICE

CROSS REFERENCE TO RELATED APPLICATION

This application is based on Japanese Patent Application No. 2011-173923 filed on Aug. 9, 2011, the disclosure of which is incorporated herein by reference.

TECHNICAL FIELD

The present disclosure relates to an air flow measuring device which measures a flow rate of air.

BACKGROUND

Conventional, a thermal-type air flow measuring device for measuring an air flow rate by use of heat transfer between the device and air is widely known. The air flow measuring device is disposed in an intake passage leading to an internal combustion engine to be used for measuring the flow rate of intake air suctioned into the engine (flow rate of intake air may be hereinafter referred to as an intake air amount).

More specifically, this air flow measuring device takes in a part of intake air flowing through the intake passage and generates a signal in accordance with the intake air amount. The air flow measuring device includes a housing that defines a bypass flow passage through which the taken-in intake air flows, and a flow sensor that produces the signal in accordance with the intake air amount as a result of heat transfer between the sensor and the intake air taken into the bypass flow passage. The air flow measuring device reduces the influence of turbulence of a flow of intake it in the intake passage by arranging a sensing part of the flow sensor in the bypass flow passage instead of disposing the sensing part directly in the intake passage, through which intake air passes, so as to output a measurement value with few variations.

In controlling the combustion of the engine, a humidity of intake air influences a propagation time of a flame. Accordingly, in controlling the combustion of the engine with gasoline as a fuel, for example, ignition timing is delayed or advanced in accordance with the humidity of intake air to optimize combustion efficiency. For this reason, an air flow measuring device which incorporates therein a humidity sensor in order to measure the humidity of intake air necessary for the combustion control of the engine is known (see, for example, JP-A-2010-043883 (corresponding to US2010/0031737A1), JP-A-H07-229776, and JP-A-H10-197305).

A housing of the air flow measuring device described in JP-A-2010-043883 includes a sub-air passage (corresponding to the bypass flow passage) that bypasses a main air passage (corresponding to the intake passage). Furthermore, the housing includes a second sub-air passage that bypasses the sub-air passage. A heating resistor and air temperature detecting part (these components correspond to the sensing part of the flow sensor) are disposed in the sub-air passage, and a humidity detecting part is set inside the second sub-air passage.

The air flow measuring device described in JP-A-H07-229778 includes a small passage (corresponding to the bypass flow passage) that bypasses main air passage (corresponding to the intake passage). A heating resistor and temperature-sensitive resistor (these components correspond to the sensing part of the flow sensor) are arranged in the small passage. Furthermore, a humidity detecting unit is disposed in the small passage on a downstream side of the heating resistor and temperature-sensitive resistor.

The air flow measuring device described in JP-A-H10-197305 includes a sub-passage that takes in a part of air flowing through an intake passage (corresponding to the bypass flow passage). A heating resistor and temperature compensation resistor (these components correspond to the sensing part of the flow sensor), and a semiconductor substrate, on which a humidity sensor is formed, are arranged in the sub-passage. Moreover, the humidity sensor is surrounded with a protector on the semiconductor substrate, and the air of the sub-passage is taken into the region enclosed by the protector through a vent hole.

However, in the air flow measuring device described in JP-A-2010-043883, JP-A-H07-229778, and JP-A-H10-197305, all the humidity sensors are disposed in the sub-passage which bypasses the intake passage and so forth. Therefore, thermal insulation from, for example, a resin material, from which the sub-passage is made, is insufficient, and a precision of the sensor may be reduced due to a heat exchange with the resin material. In addition, a flow of air in the sub-passage and so forth is easily influenced by a rail surface resistance as compared with inside the intake passage, and a speed of the flew thereby becomes slow. Consequently, the responsivity of the sensor may be also low.

SUMMARY

According to the present disclosure, there is provided an air flow measuring device that is adapted to be disposed in an intake passage through which intake air drawn into an internal combustion engine flows and that is configured to measure a flow rate of intake air flowing through the intake passage. The device includes a housing, a flow sensor, and a humidity sensor. The housing defines a bypass flow passage through which intake air passes. A part of intake air is taken into the bypass flew passage to pass through the bypass flow passage. The flow sensor includes a sensing part disposed in the bypass flow passage, and is configured to produce a signal which is in accordance with the flow rate of intake air as a result of heat transfer between is intake air taken into the bypass flow passage and the sensing part. The humidity sensor includes a sensing part exposed to the intake passage, and projects from an outer wall of the housing into the intake passage. The humidity sensor is configured to produce a signal which is in accordance with humidity of intake air flowing through the intake passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An air flow measuring device according to an embodiment is adapted to be disposed in an intake passage through which intake air drawn into an internal combustion engine flows, and is configured to measure a flow rate of intake air flowing through the intake passage. The device includes a housing, a flow sensor, and a humidity sensor. The housing defines a bypass flow passage through which intake air passes. A part of intake air is taken into the bypass flow passage to pass through the bypass flow passage. The flow sensor includes a sensing part disposed in the bypass flow passage, and is configured to produce a signal which is in accordance with the flow rate of intake air as a result of heat transfer between intake air taken into the bypass flow passage and the sensing part. The humidity sensor includes a sensing part exposed to the intake passage, and projects from an outer wall of the housing into the intake passage. The humidity sensor is configured to produce a signal which is in accordance with humidity of intake air flowing through the intake passage.

The housing may be fixed to a passage wall of the intake passage by inserting the housing into the intake passage through an insertion opening of the passage wall such that the housing projects from a vicinity of the passage wall where a flow speed of intake air in the intake passage is small toward a center of the intake passage where the flow speed is large. The housing may include a protection part on the outer wall of the housing. The protection part is elevated to avoid a contact of the humidity sensor with an edge of the insertion opening at time of the insertion of the housing and to protect the humidity sensor.

At time of resin-formation of the housing, the humidity sensor may be resin-molded to be integrated into the housing. The air flow measuring device may further include a connector that is provided integrally with the housing. A power supply terminal of the flow sensor and a power supply terminal of the humidity sensor may be connected together inside the housing to be conductive to one terminal in the connector. A ground terminal of the flow sensor and a ground terminal of the humidity sensor may be connected together inside the housing to be conductive to another terminal in the connector.

Configuration of an air flow measuring device 1 of the embodiment will be described below in reference to FIGS. 1 to 4. The air flow measuring device 1 measures an air flow rate by means of heat transfer between the device 1 and air. For example, the device 1 is attached to a pipe member 4, which is formed into a passage wall 3 of an intake passage 2 leading to the engine (not shown) to be set in the intake passage 2, and the device 1 measures a flow rate (intake air amount) of intake air drawn into the engine. The air flow measuring device 1 includes a housing 7 which defines a bypass flow passage 6 through which intake air passes a flow sensor 8 which generates a signal that is in accordance with the intake air amount as a result of heat transfer from the intake air flowing through the bypass flow passage 6, and a connector 9 provided integrally with the housing 7.

The housing 7 includes a bypass forming part 11 which defines the bypass flow passage 6 and projects into the intake passage 2, a fitted part 12 which serves as a base of the bypass forming part 11 and is fitted to the passage wall 3, and a fixing part 13 which is screwed to the pipe member 4.

The bypass forming part 11 takes a part of intake air flowing through the intake passage 2 into the bypass flow passage 6, and makes it pass through the passage 6. Thus, the bypass forming part 11 serves as a core part of the housing 7. The bypass forming part 11 is inserted into the intake passage through an insertion opening (not shown) provided for the passage wall 3 to project into the intake passage 2 from the vicinity of the passage wall 3 where a flow speed is small toward the center of the passage 2 where the flow speed is large. A direction in which the bypass forming part 11 projects is perpendicular to a flow of intake air in the intake passage 2.

Figure 3:
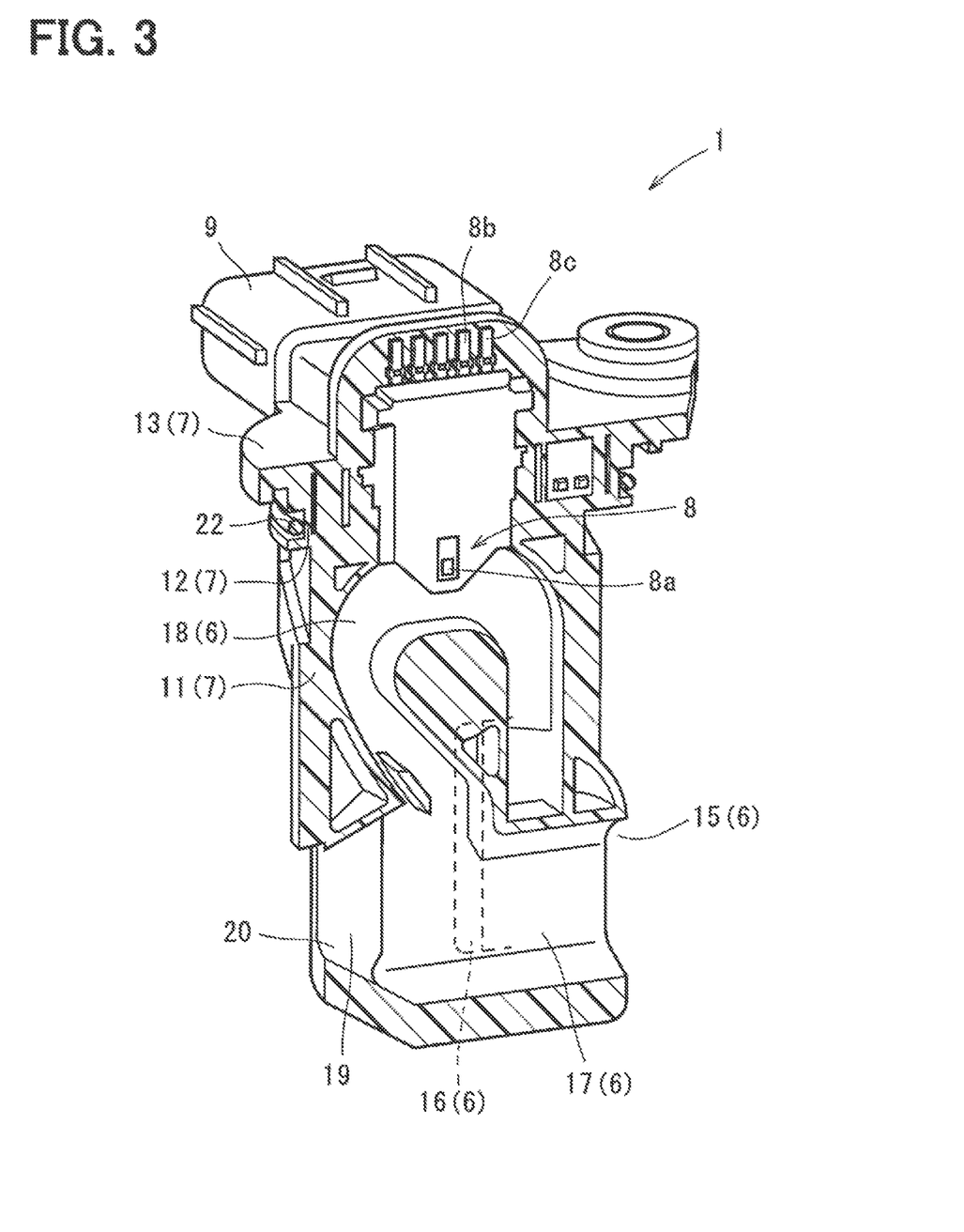
FIG. 3 is a sectional perspective view illustrating an inner part of the air flow measuring device of the embodiment.

The bypass flow passage 6 includes an inlet 15 for intake air that opens into the intake passage 2 toward an upstream side of the intake air flow, an outlet 16 for intake air that opens into the intake passage 2 toward a downstream side of the intake air flow, a straight passage 17 that extends linearly from the inlet 15 to make the intake air flow straight in the same direction as the intake air flow in the intake passage 2, and a circulation passage 18 that makes flow around the intake air flowing straight through the straight passage 17 to divert the air into the outlet 16. Accordingly, a passage length of the bypass flow passage 6 is longer than a passage length in a case where the air is not taken into the bypass flow passage 6 and flows straight through the intake passage 2. The circulation passage 18 branches into two passages on the downstream side, and the two outlets 16 are thereby provided.

A dust discharge passage 19 for discharging dust is connected linearly to the straight passage 17. A downstream end of the dust discharge passage 19 serves as a dust discharge port 20 that opens into the intake passage 2 toward a downstream side of the intake air flow.

Figure 1:
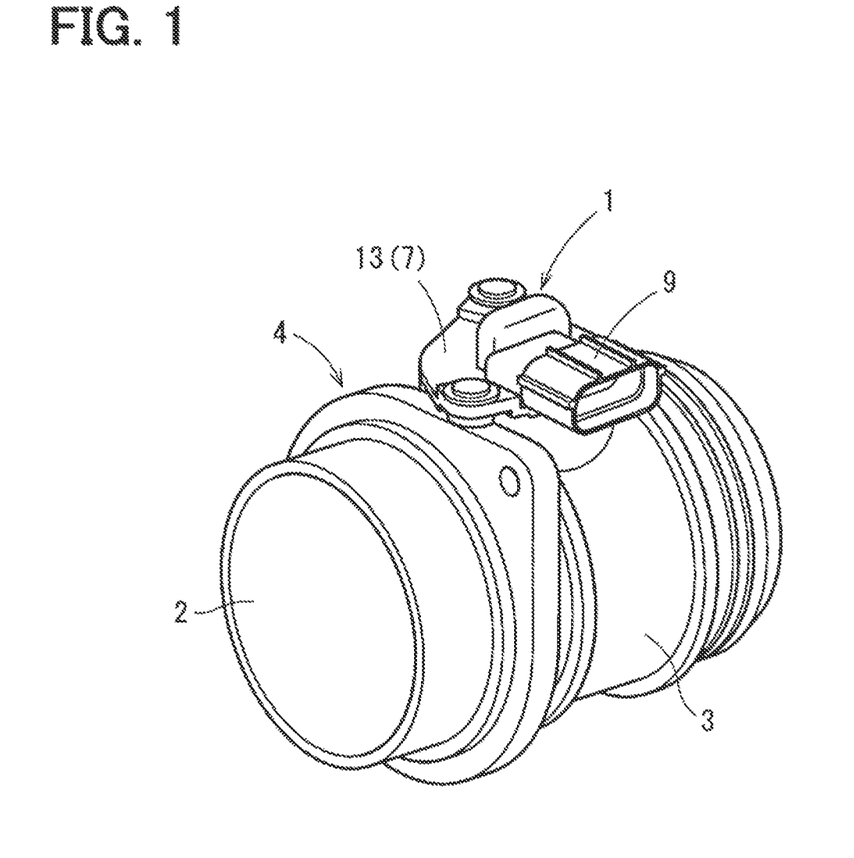
FIG. 1 is a perspective view illustrating an air flow measuring device attached to a pipe member in accordance with an embodiment.
Figure 2:
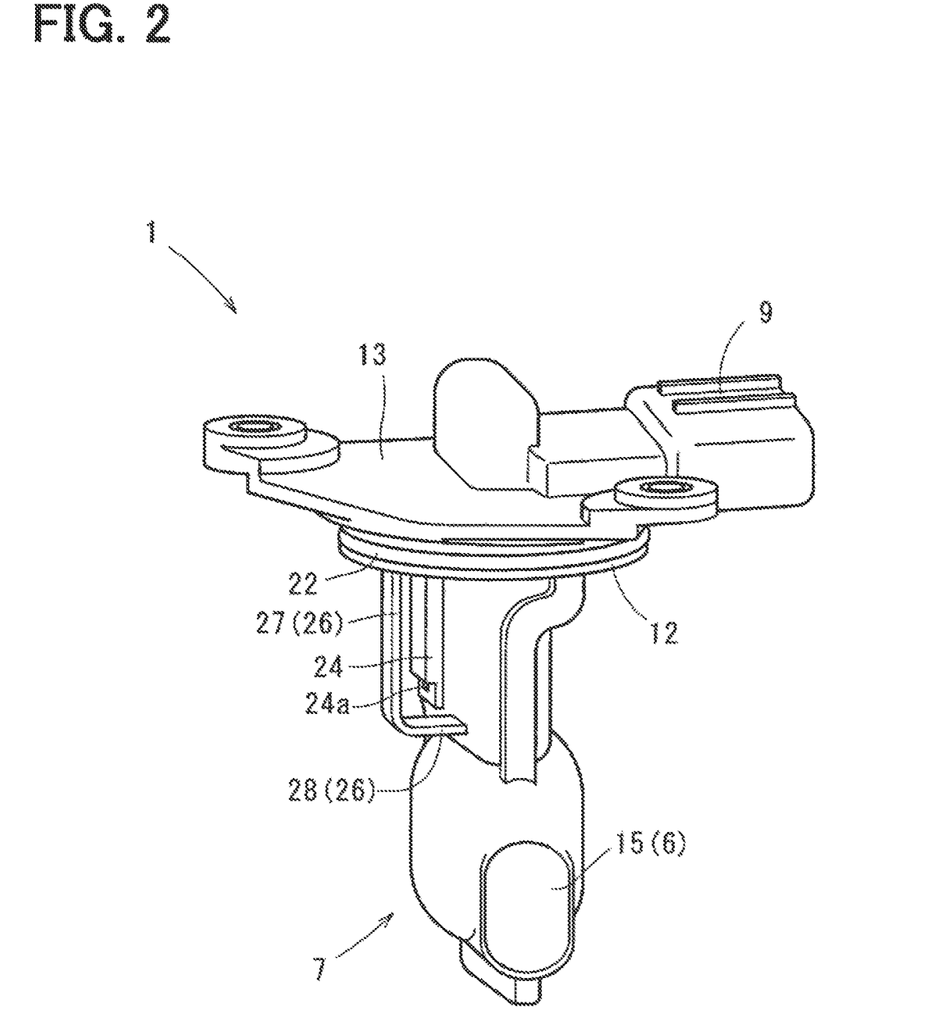
FIG. 2 is a perspective view illustrating the air flow measuring device of the embodiment.
Figure 4:
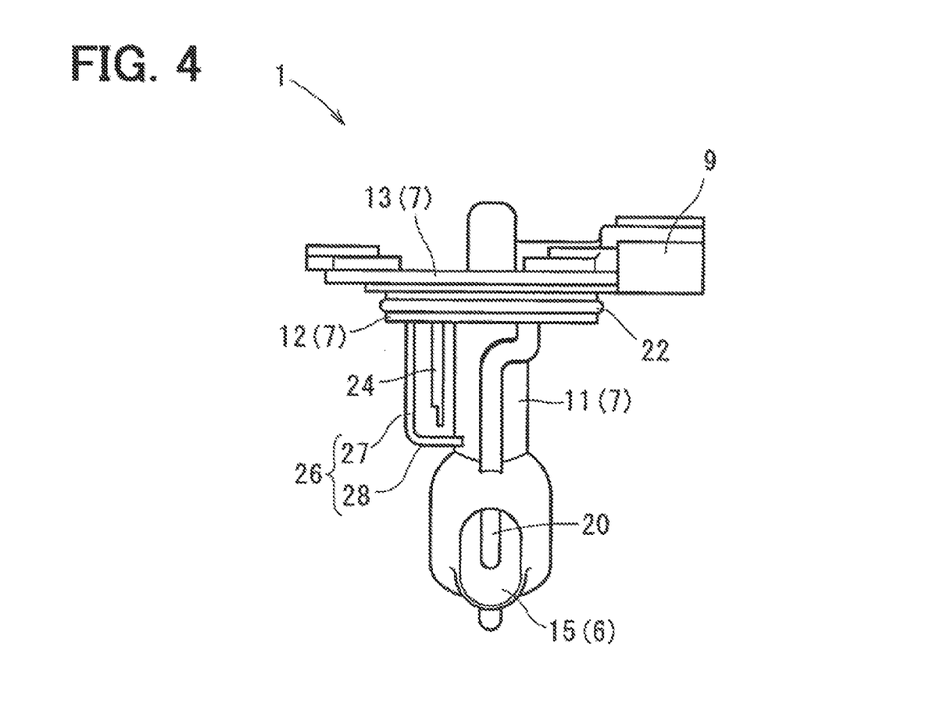
FIG. 4 is a rear view illustrating the air flow measuring device of the embodiment.
Figure 5:
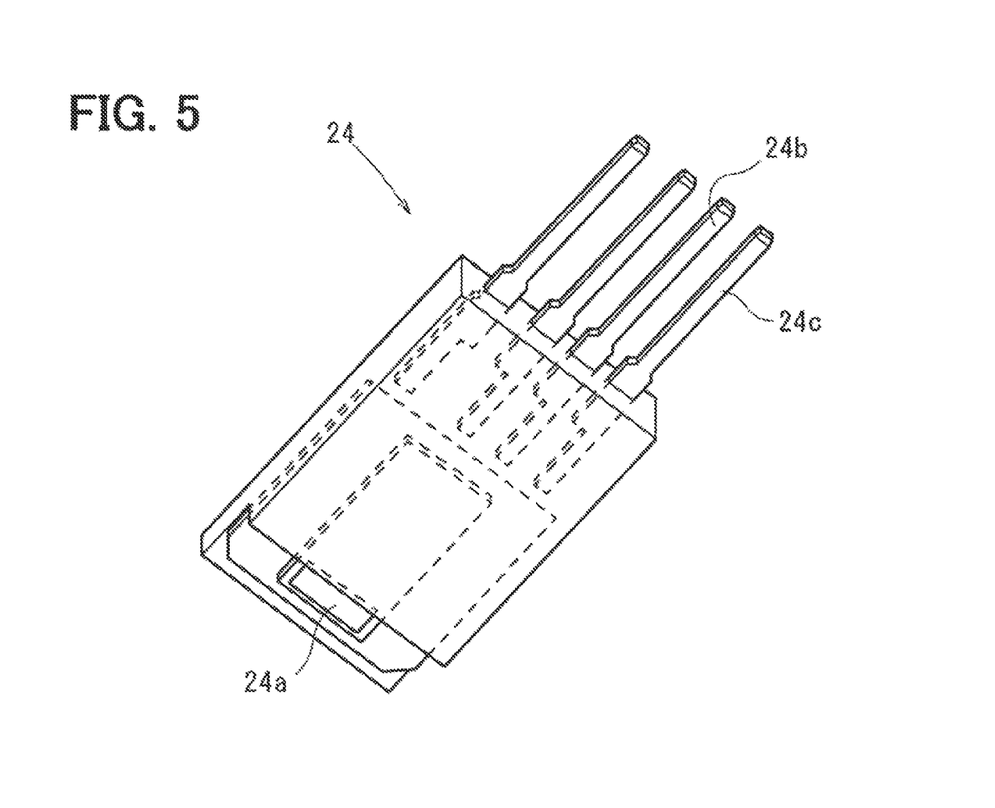
FIG. 5 is a perspective view illustrating a humidity sensor according to the embodiment.

The fitted part 12 is formed in a cylindrical shape, and an annular groove, into which O-ring 22 is fitted, is formed on an outer peripheral surface of the fitted part 12. The fitted part 12 is fitted into the insertion opening of the passage wall 3, so that the intake passage 2 is sealed from the outside with the O-ring 22. The bypass forming part 11 extends perpendicularly from one of both end surfaces of the fitted part 12 in its axial direction, and the fixing part 13 and the connector 9 are provided on the other end surface of the fitted part 12. The connector 9 is formed integrally with the housing 7, for example, at the same time as resin formation of the housing 7.

The flow sensor 8 includes a sensing part 8a that is disposed in the bypass flow passage 6, and a processing part (not shown) that performs predetermined processing on a signal generated in the sensing part 8a. The sensing part 8a produces the signal that is in accordance with the intake air amount as a result of a heat transfer between the sensing part 8a and the intake air passing through the bypass flow passage 6. The signal generated in the sensing part 8a is outputted to an electronic control unit (not shown) outside the air flow measuring device 1 through predetermined processing in the processing part, to be used for, for example, various kinds of control processing such as fuel injection control.

The sensing part 8a projects at a position that is located on the rear side of the circulation passage 18 and the farthest from the straight passage 17. At the position of the circulation passage 18 at which the sensing part 8a is arranged, the flow of intake air is opposite from the flow in the straight passage 17 and the intake air flow in the intake passage 2.

As described above, the it flow measuring device 1 is not influenced directly by the turbulence of the intake air flow in the intake passage 2 by arranging the sensing part 8a of the flow sensor 8 in the bypass flow passage 6 instead of disposing the sensing part 8a directly in the intake passage 2, so as to output the measurement value with few variations.

Characteristics of the air flow rate measuring device 1 in accordance with the embodiment will be described with reference to FIGS. 2 to 5. The air flow measuring device 1 includes a humidity sensor 24 which generates a signal that is in accordance with a humidity of intake air flowing through the intake passage 2. The humidity sensor 24 uses, for example, a change of a dielectric constant of a polymer membrane in accordance with a change of relative humidity. The sensor 24 includes a sensing part 24a having the polymer membrane whose dielectric constant changes according to the relative humidity, and various kinds of terminals such as a power supply terminal 24b and a ground terminal 24c (see FIG. 5).

The humidity sensor 2 is resin-molded at the time of the resin formation of the housing 7, and is integrated with the housing 7. The humidity sensor 24 projects from the fitted part 12 toward the center of the intake passage 2 such that the sensing part 24a is exposed into the intake passage 2. A direction in which the humidity sensor 24 projects from the fitted part 12 is the same as a direction in which the bypass forming part 11 projects into the intake passage 2, and is parallel to an outer wall surface of the bypass forming part 11 (see, for example, FIG. 4).

A protection part 26 treat protects the humidity sensor 2 to avoid a contact of the humidity sensor 24 with a rim of the insertion opening at the time of insertion of the housing 7 into the intake passage 2 is raised on the outer wall of the housing 7. The protection part 26 is composed of a longitudinal part 27 that extends from the fitted part 12 in the same direction as the humidity sensor 24, and a transverse part 28 which bridges between an end of the longitudinal part 27 and the outer wall of the bypass forming part 11 on the front end side of the humidity sensor 24 and is perpendicular to the longitudinal part (see, for example, FIGS. 2 and 4).

A power supply terminal 8b of the flow sensor 8 and the power supply terminal 24b of the humidity sensor 24 are connected together inside the housing 7, and conductive to one terminal (not shown) in the connector 9. Similarly, a ground terminal 8c of the flow sensor 8 and the ground terminal 44c of the humidity sensor 24 are connected together inside the housing 7, and conductive to another terminal (not shown) in the connector 9.

Effects of the air flow measuring device 1 of the embodiment will be described below. The air flow measuring device 1 of the embodiment includes the humidity sensor 24 that has the sensing part 24a exposed into the intake passage 2 and that, projects from the outer wall of the housing 7 into the intake passage 2 to generate the signal which is in accordance with the humidity of intake air flowing through the intake passage 2. Accordingly, the sensing part 24a of the humidity sensor 24 is disposed to project into the center of the passage 2 where the flow speed is large. Therefore, thermal insulation in relation to the resin material, from which the passage wall 3 and the housing 7 are formed, is improved, and the influence of a wall surface resistance becomes small.

Because of the bypass forming part 11 of the housing 7, the flow in the intake passage 2 near the bypass forming part 11 is narrowed down to increase the flow speed. Thus, the improvement of the thermal insulation and the reduction of the influence surface resistance with regard to the humidity sensor 24 are even more significant. As a result, accuracy and responsivity in the measurement of humidity of intake air by the air flow measuring device 1 can be increased.

The protection part 26 that protects the humidity sensor 24 to avoid a contact of the humidity sensor 24 with a rim of the insertion opening at the time of insertion of the bypass forming part 11 into the intake passage 2 is provide for the housing 7. Consequently, the air flow measuring device 1 can be attached to the pipe member 4 without damaging the humidity sensor 24. Moreover, owing to the protection part 26, the flow in the intake passage 2 close to the humidity sensor 24 is further reduced to increase the flow speed. Thus, the improvement of the thermal insulation and the reduction of the influence of wall surface resistance with regard to the humidity sensor 24 are even more significant. For this reason, accuracy and responsivity in the measurement of humidity of air by the air flow measuring device 1 can be further increased.

The humidity sensor 24 is resin-molded at the time of the resin formation of the housing 7, and is integrated with the housing 7. Accordingly, since the humidity sensor 24 can be integrated into the air flow measuring device 1, man-hours for the attachment of components to the engine can be reduced. In addition, by integrating the humidity sensor 24 into the air flow measuring device 1, the terminal in the connector 9 can be shared between the flow sensor 8 and the humidity sensor 24, and the number of harnesses can be reduced.

Figure 6A:
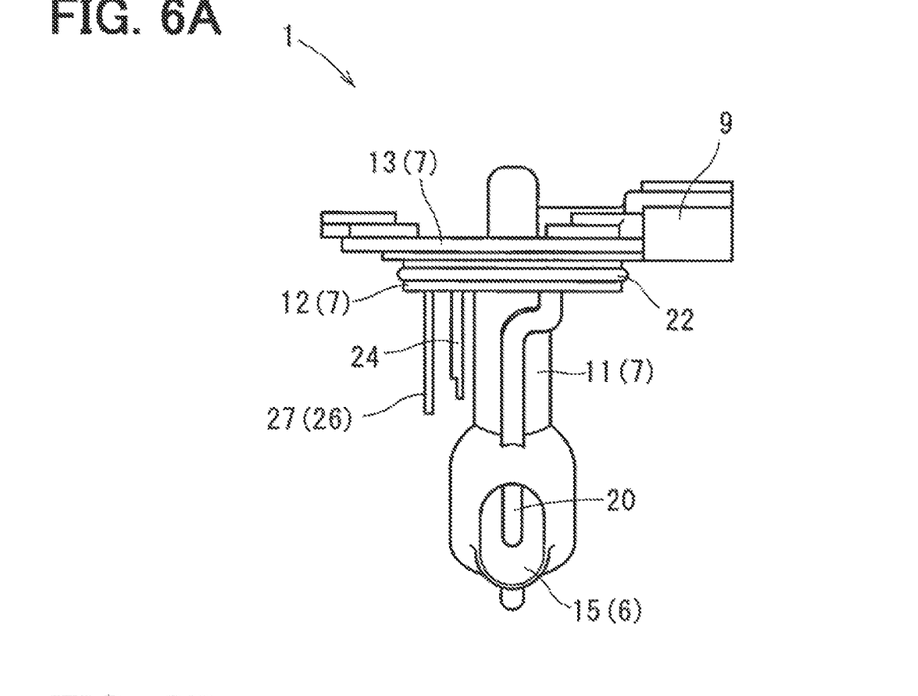
FIG. 6A is a rear view illustrating an air flow measuring device in accordance with a modification.
Figure 6B:
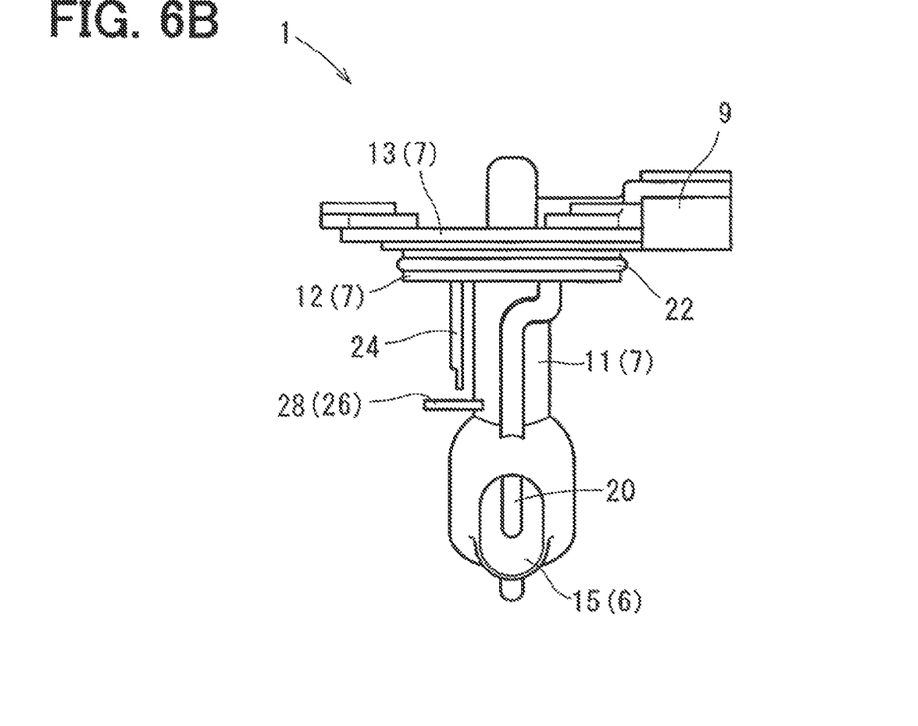
FIG. 6B is a rear view illustrating an air flow measuring device according to a modification.

The mode of the it flow measuring device 1 is not limited to the above-described embodiment, and various modifications may be made to the mode of the device 1. For example, in the air flow measuring device 1 of the embodiment, the protection part 26 is constituted of the longitudinal part 27 extending in the same direction as the humidity sensor 24, and the transverse part 28 perpendicular to the longitudinal part 27. Alternatively, for example, the protection part 26 may be made up only of the longitudinal part 27 (see FIG. 6A), or the protection part 24 may be made up only of the transverse part 28 (see FIG. 6B).

Figure 7:
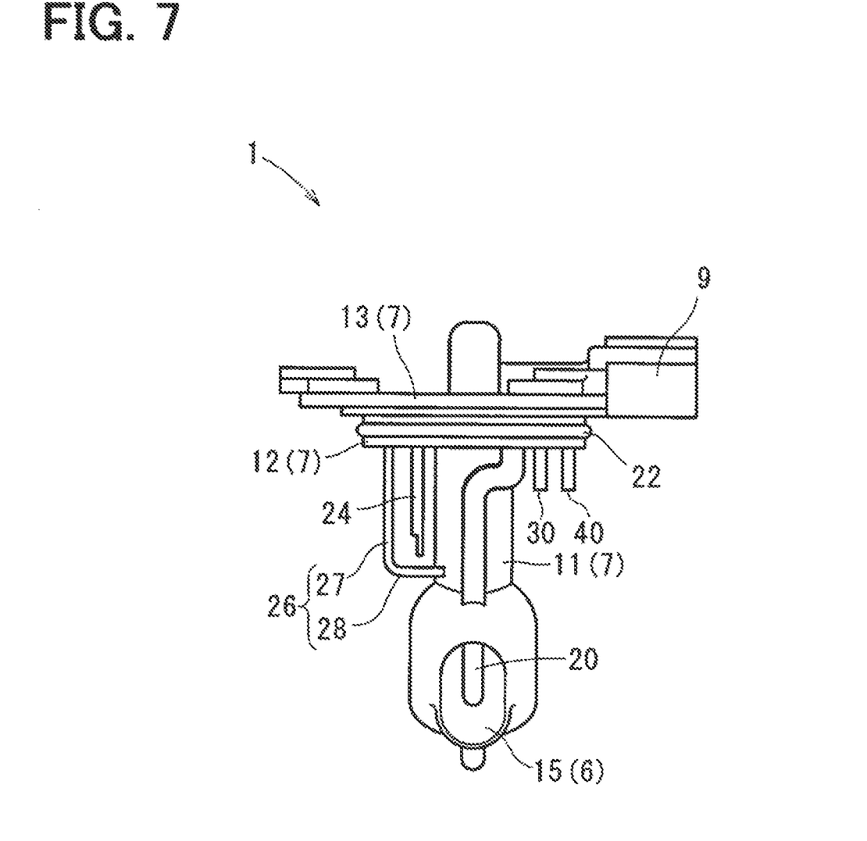
FIG. 7 is a rear view illustrating an air flow measuring device having a humidity sensor, a temperature sensor and a pressure sensor according to a modification.

Moreover, together with the humidity sensor 24, a temperature sensor 30 that generates a signal in accordance with temperature of intake air which flows through the intake passage 2, and a pressure sensor 40 that generates a signal in accordance with pressure of intake air which flows through the intake passage 2, may be provided for the air flow measuring device 1 (see FIG. 7). At the time of the resin formation of the housing 7, the humidity sensor 24, the temperature sensor 30, and the pressure sensor 40 may be resin-molded to be integrated with the housing 7.

In this case, not only the humidity sensor 24 but also the temperature sensor 30 and pressure sensor 40 can be integrated into the air flow measuring device 1. Accordingly, the man-hours for the attachment of components to the engine can be further reduced. In addition, by integrating the humidity sensor 24, the temperature sensor 30, and the pressure sensor 40 into the air flow measuring device 1, the terminal in the connector 9 can be shared between the humidity sensor 24, the temperature sensor 30, and the pressure sensor 40, and the number of harnesses can be reduced. Alternatively, the temperature sensor 30 and the pressure sensor 40 may be integrated into the humidity sensor 24.

To sum up, the air flow measuring device 1 of the above embodiment can be described as follows.

An air flow measuring device 1 is adapted to be disposed in an intake passage 2 through which intake air drawn into an internal combustion engine flows, and is configured to measure a flow rate of intake air flowing through the intake passage 2. The device 1 includes a housing, a flow sensor 8, and a humidity sensor 24. The housing 7 defines a bypass flow passage 6 through which intake air passes. A part of intake air is taken into the bypass flow passage 6 to pass through the bypass flow passage 6. The flow sensor 8 includes a sensing part 8a disposed in the bypass flow passage 6, and is configured to produce a signal which is in accordance with the flow rate of intake air as a result of heat transfer between intake it taken into the bypass flow passage 6 and the sensing part 8a.

The humidity sensor 24 includes a sensing part 24a exposed to the intake passage 2, and projects from an outer wall of the housing 7 into the intake passage 2. The humidity sensor 24 is configured to produce a signal which is in accordance with humidity of intake air flowing through the intake passage 2.

Accordingly, the sensing part 24a of the humidity sensor 24 projects from the outer wall of the housing 7 into the intake passage 2 in which the flow speed is large. Thus, a thermal insulation with regard to a resin material which is formed into the intake passage 2 and so forth, or the housing 7 improves, and the influence of wall surface resistance becomes small. In addition, because of the housing 7 itself, the flow in the intake passage 2 in the vicinity of the housing 7 is narrowed down to increase the flow speed. Thus, the improvement of the thermal insulation and the reduction of the influence of wall surface resistance with regard to the humidity sensor 24 are even more significant. As a result, accuracy and responsivity in the measurement of humidity of air by the air flow measuring device 1 can be increased.

The housing 7 may be fixed to a passage wall 3 of the intake passage 2 by inserting the housing 7 into the intake passage 2 through an insertion opening of the passage wall 3 such that the housing 7 projects from a vicinity of the passage wall 3 where a flow speed of intake air in the intake passage 2 is small toward a center of the intake passage 2 where the flow speed is large. The housing 7 may include a protection part 26 on the outer wall of the housing 7. The protection part 26 is elevated to avoid a contact of the humidity sensor 24 with an edge of the insertion opening at time of the insertion of the housing 7 and to protect the humidity sensor 24.

Consequently, the air flow measuring device 1 can be attached to the member which constitutes, the intake passage 2 without damaging the humidity sensor 24. Moreover, owing to the protection part 26, the flow in the intake passage 2 close to the humidity sensor 24 is further reduced to increase the flow speed. Thus, the improvement of the thermal insulation and the reduction of the influence of wall surface resistance with regard to the humidity sensor 24 are even more significant. For this reason, accuracy and responsivity in the measurement of humidity of air by the air flow measuring device 1 can be further increased.

At time of resin-formation of the housing 7, the humidity sensor 24 may be resin-molded to be integrated into the housing 7. Accordingly, since the humidity sensor 24 can be integrated into the air flow measuring device 1, man-hours for the attachment of components to the engine can be reduced. In addition, by integrating the humidity sensor 24 into the air flow measuring device 1, the terminal in the connector 9 can be shared between the flow sensor 8 and the humidity sensor 24, and the number of harnesses can be reduced.

The air flow measuring device 1 may further include: a temperature sensor 30 that is configured to produce a signal which is in accordance with temperature of intake air flowing through the intake passage 2, and a pressure sensor 40 that is configured to produce a signal which is in accordance with pressure of intake air flowing through the intake passage 2. At time of resin-formation of the housing 7, the humidity sensor 24, the temperature sensor 30, and the pressure sensor 40 may be resin-molded to be integrated into the housing 7.

Accordingly, not only the humidity sensor 24 but also the temperature sensor 30 and pressure sensor 40 can be integrated into the air flow measuring device 1. As a result, the man-hours for the attachment of components to the engine can be further reduced. In addition, by integrating the humidity sensor 24, the temperature sensor 30, and the pressure sensor 40 into the air flow measuring device 1, the terminal in the connector 9 can be shared between the humidity sensor 24, the temperature sensor 30, and the pressure sensor 40, and the number of harnesses can be reduced.

The air flow measuring device 1 may further include a connector 9 that is provided integrally with the housing 7. A power supply terminal 8b of the flow sensor 8 and a power supply terminal 24b of the humidity sensor 24 may be connected together inside the housing 7 to be conductive to one terminal in the connector 9. A ground terminal 8c of the flow sensor 8 and a ground terminal 24c of the humidity sensor 24 may be connected together inside the housing 7 to be conductive to another terminal in the connector 9. This means illustrates one mode to share the terminal in the connector 9 between the flow sensor 8 and the humidity sensor 24. Accordingly, the number of harnesses can be reduced.

Additional advantages and modifications will readily occur to those skilled in the art. The invention in its broader terms is therefore not limited to the specific details, representative apparatus, and illustrative examples shown and described.

What is claimed is:

1. An air flow measuring device that is adapted to be disposed in an intake passage through which intake air drawn into an internal combustion engine flows and that is configured to measure a flow rate of intake air flowing through the intake passage, the device comprising:
    a housing that defines a bypass flow passage through which intake air passes, wherein a part of intake air is taken into the bypass flow passage to pass through the bypass flow passage;
    a flow sensor that includes a sensing part disposed in the bypass flow passage and that is configured to produce a signal which is in accordance with the flow rate of intake air as a result of heat transfer between intake air taken into the bypass flow passage and the sensing part; and
    a humidity sensor that includes a sensing part exposed to the intake passage and that projects from an outer wall of the housing into the intake passage, the humidity sensor configured to produce a signal which is in accordance with humidity of intake air flowing through the intake passage, wherein at time of resin-formation of the housing, the humidity sensor is resin-molded to be integrated into the housing.

2. The air flow measuring device according to claim 1, wherein:
    the housing is fixed to a passage wall of the intake passage by inserting the housing into the intake passage through an insertion opening of the passage wall such that the housing projects from a vicinity of the passage wall where a flow speed of intake air in the intake passage is small toward a center of the intake passage where the flow speed is large;
    the housing includes a protection part on the outer wall of the housing; and
    the protection part is elevated to avoid a contact of the humidity sensor with an edge of the insertion opening at time of the insertion of the housing and to protect the humidity sensor.

3. The air flow measuring device according to claim 1, further comprising:
    a temperature sensor that is configured to produce a signal which is in accordance with temperature of intake air flowing through the intake passage; and
    a pressure sensor that is configured to produce a signal which is in accordance with pressure of intake air flowing through the intake passage, wherein at time of resin-formation of the housing, the humidity sensor, the temperature sensor, and the pressure sensor are resin-molded to be integrated into the housing.

4. The air flow measuring device according to claim 1, further comprising a connector that is provided integrally with the housing, wherein:
   a power supply terminal of the flow sensor and a power supply terminal of the humidity sensor are connected together inside the housing to be conductive to one terminal in the connector; and
   a ground terminal of the flow sensor and a ground terminal of the humidity sensor are connected together inside the housing to be conductive to another terminal in the connector.

* * * * *